Figure 1:
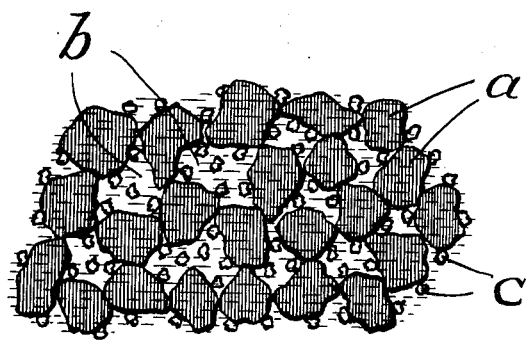

April 18, 1939.  W. E. KERSHAW  2,155,016
SEPARATIVE DIAPHRAGM FOR ELECTROLYTIC CELLS
AND PROCESS FOR PRODUCING THE SAME
Filed March 7, 1936

INVENTOR
William E. Kershaw
BY
Augustus B. Stoughton
ATTORNEY.

WITNESS:

Patented Apr. 18, 1939

2,155,016

UNITED STATES PATENT OFFICE 2,155,016

SEPARATIVE DIAPHRAGM FOR ELECTROLYTIC CELLS AND PROCESS FOR PRODUCING THE SAME

William E. Kershaw, Gwynedd Valley, Pa., assignor to The Electric Storage Battery Company, Philadelphia, Pa., a corporation of New Jersey Application March 7, 1936, Serial No. 67,659

4 Claims. (Cl. 18—53)

The physical, chemical and electrical properties essential for a thoroughly successful and satisfactory separator are, (1) mechanical rigidity combined with sufficient toughness and flexibility to permit handling and assembly when in the form of thin ribbed or plain sheets, (2) ionic permeability resulting in low electrical resistance, (3) resistance to the oxidizing effect of the lead peroxide of the positive place combined with electrolytic action, especially when accompanied by pressure due to buckling, (4) resistance to attack by the sulphuric acid electrolyte at maximum concentrations and temperatures occurring in service, (5) porosity of such microscopic dimensions as to prevent penetration by particles of sediment from the active material of the plates, thus causing short circuits, (6) freedom from deterioration when kept in stock in a dry condition for an indefinite period, (7) facility of manufacture in the form of sheets, plain or ribbed, or tubes, (8) low cost.

Various processes and products have been proposed to accomplish these results, but thus far none has succeeded in providing a satisfactory combination of all of the above characteristics. The wood diaphragm separator now almost universally employed is satisfactory from the standpoint of ionic permeability and microporosity but is mechanically weak and subject to oxidation and attack by strong acid at high temperatures.

The only other storage battery separator in extensive use which approaches the wood diaphragm in respect to ionic permeability and microporosity is that resulting from the coagulation of rubber latex into a gel or reticulate structure and its subsequent vulcanization to hard rubber by the process disclosed in Beckmann Patent No. 1,745,657.

This separator, however, is subject to oxidation by contact with the positive plate, though superior to wood in this respect; it is produced of comparatively expensive material, and it cannot be subjected to pressure as by rolling during manufacture without destroying its porosity and ionic permeability.

It has been proposed to add an inert finely divided mineral filler to the Beckmann material during manufacture, to reduce its cost and provide greater resistance to oxidation but the addition of such material fills up the pores and reduces the ionic permeability and also reduces the mechanical strength.

Other processes for combining rubber with inert fillers have been proposed but, in all cases, by introducing the rubber in the form of a solution or by causing coagulation they result in a product in which the inert particles are quite completely coated with rubber or embedded in a continuous rubber mesh; or if the proportion of rubber is sufficiently reduced to avoid filling the voids between the particles of inert material, mechanical strength disappears almost completely, owing to the fact that only a small proportion of the particles of the rubber are effective in binding the inert particles.

I have discovered that by introducing certain novel steps in the process of producing a microporous separator from a mixture of an inert finely divided mineral with an emulsion of an adhesive in which the latter is in the discontinuous phase, I can cause the particles of the adhesive to concentrate at points where they will have maximum binding effect without unduly filling the voids, and by thus reducing to a minimum the proportion of binder to inert powder, I obtain maximum ionic permeability while retaining pronounced mechanical strength and resistance to oxidation.

These novel steps are, first, the prevention of coagulation of the particles of adhesive into a continuous structure permeating the entire mass, thus holding them as discrete particles or possibly minute aggregations of comparatively insignificant proportions, and, second, the concentration of these adhesive particles at points of proximity between adjacent inert particles to effect the maximum binding effect.

The preferred method of introducing this second step consists in removing the greater portion of the liquid of the continuous phase of the emulsion after the inert finely divided material has been thoroughly mixed therewith and while the binder is still in the discontinuous phase. This may be accomplished by drying. A rational explanation of the effect of this step is that as the liquid is removed to the point where the residue of this liquid is insufficient to fill the spaces between the inert particles, the well known capillary forces will cause the remaining liquid with its entrained minute particles of binder to concentrate at the points where the inert particles are in approximate contact, leaving the larger spaces void. At this point the product may be subjected to heavy pressure without reducing its porosity or ionic permeability, with the effect of causing the particles of binder to firmly cement the whole mass into a semi-rigid tough and quite flexible product. By thus concentrating the particles of the adhesive where they have the maximum binding effect and a minimum obstruction to the voids in the mass, thus permitting the use of a maximum proportion of inert material to binder, there results a combination of microporosity, ionic permeability, resistance to oxidation, mechanical toughness, flexibility and elasticity which has never to my knowledge heretofore been achieved. The materials are low in cost since the proportion of the more expensive binder is reduced to a minimum, and the processes of mixing, drying and rolling can be carried out with well known apparatus.

The principles upon which this invention or discovery rests will be given in detail further on, but may be very simply stated here. If a very finely divided, chemically inert substance, such as diatomaceous earth, is so chosen that its particles vary in size and shape, it is evident that a mass of this substance even when compacted under pressure will contain a high percentage of voids, and that these voids will in general communicate with each other and with the surfaces of the mass, or, in other words, it will be highly porous. As a concrete illustration, a variety of "Celite", a commercial diatomaceous earth, was compacted and was found to take up water to an amount of 80% of its apparent volume. It is clear that since commercial diaphragms have a useful porosity of 50% to 60%, some of the above excess porosity can be sacrificed to a binding agent to cement the particles together and hence produce a unified or bonded product of commercial utility. Several such proposals have in fact been made in a number of patents. Their disclosures, however, involve the complete coating of each particle of inert substance with a layer of the cementing material, and where this layer has any real thickness, as is necessary to obtain a good mechanical bond and where the particles are very small as is necessary to obtain an efficient diaphragm, there is great likelihood of the bonding material filling or closing off a large proportion of the smaller voids and thus rendering the product undesirable.

A feature of novelty in my invention consists in providing for a selective deposition of the binding agent only at points of actual or approximate contact of the inert particles by taking advantage of the fact that most of the desirable binding agents can be used in the form of an emulsion, and of the further fact that by drying or other means, the individual globules of the bonding agent can be caused to attach themselves exactly where they have maximum usefulness. Thus, the novel product obtained has the optimum of mechanical strength with the greatest possible useful porosity and shows a combination of properties which have not heretofore been attained in any of the various types of separators and which are inherent in its unique construction.

That this construction is definitely achieved and that the binding agent is deposited in minute amounts at a multiplicity of points throughout the mass, rather than being essentially continuous throughout the mass, as in the prior art, can be readily proved by treating the product with a solvent of the inert powdered filler, but which does not dissolve the binder, whereupon it will be found that the entire mass disintegrates, whereas specimens of the prior art leave a spongy mass of porous binder. As an example, a diaphragm of my invention composed of diatomaceous earth and rubber, when treated overnight with hydrofluoric acid and the whole warmed, will disintegrate into finely divided particles of rubber as the silica of the diatomaceous earth is dissolved.

The diaphragm of this invention consists of a substantially solid but micro-porous body composed of such proportions of a finely divided or powdered inert material, substantially insoluble in electrolyte and which is not necessarily porous in itself, that when said material is bound together by an initially fluid or plastic adhesive or cementing agent which has been previously dispersed into the discontinuous phase of an emulsion in a liquid non-miscible therewith, and the whole has been thoroughly mixed together, with or without an admixture of reinforcing fibers, and when the minute globules of adhesive agent by suitable means are assembled at and caused to adhere to the junctions or closest approximations of the adjacent particles of the inert material, there will be insufficient globules of adhesive completely to coat the comminuted material or to fill up the voids, and the resultant body so formed will have a substantial proportion of voids in intercommunication throughout the mass, thus rendering it peculiarly suitable for use as an electrolytic diaphragm.

In the development of the present invention it was discovered that if the emulsion is mixed with the subdivided substance when the cementing material is in the discontinuous phase, the globules of cementing material, if not in superabundance, can be caused by proper means to tend to lodge at or between contiguous portions of surrounding particles rather than at random on their surfaces, and the resultant product retains a very high degree of permeability; and flexibility and resistance to shock. This preferential lodgment of globules of adhesive at or between two contiguous or nearly contiguous points of adjacent inert particles thus tending to result in a multiplicity of scattered bonds throughout the mass of the product, can in many cases be effected by a simple drying operation. It is clear that if the liquid of the continuous phase of the emulsion used is gradually withdrawn by evaporation and the voids between the particles become filled with air or vapor, capillary attraction will cause the remaining liquid with its globules of adhesive to be drawn to those points where the particles are in contact, or nearly so, and that further withdrawal of liquid will assemble the globules of adhesive into the most efficient position for cementing the particles together. Although the mechanism is not so clear, it has been found that in many cases the application of heat is sufficient to cause the adhesion of the emulsion globules at the points of proximation of the particles—possibly through changes in electric charges causing concentration at such points. Again, sufficient pressure applied mechanically to cause a portion of the liquid to be squeezed out of the mass and then released, often assists the selective placement of the globules of cement. This may be due to the molecular forces set up when films of liquid forming the continuous phase, are partially or completely expelled by the high mechanical pressures developed between adjacent points of the particles, or perhaps in some more complex way.

Similarly, the addition after the inert powder and the emulsion have been thoroughly mixed of such electrolyte as has a tendency slowly to "break" the emulsion used, has proved successful in many cases, again quite possibly through redistribution of electric charge. It is important that this addition be made subsequent to the mixture of the other ingredients in order to avoid the premature coagulation of the binder into a continuous net like structure. It must be understood, however, that I do not limit myself to any theory, but that those given above are merely an effort to create a clear picture of how such results take place. In any case, a person experienced in handling emulsions should have no difficulty in duplicating my results by any of the four methods given above, or combinations thereof, or by other methods, provided the general proportions given hereafter are followed.

Similarly, a person who is familiar with emulsions will realize that due to their varying stability under almost any change in their physical surroundings, it may be necessary in some cases to use a protective colloid to avoid the chance of their premature breaking down and forming a continuous network by the coalescing of their globules, or to avoid any change of phase which would put the cementing agent into a continuous film. Such a protective colloid cannot be chosen at random, as some may also tend to inhibit the selective bonding action desired. I have found ammonium linoleate particularly suitable for use in this product, as it tends to stabilize a variety of different emulsions under the conditions of fabrication and yet does not interfere or prevent successful bonding. Saponified castor oil is also useful in this connection. Under heavy machine mixing or severe rolling conditions and where the continuous phase of the emulsion is aqueous, sodium silicate solution, though not strictly a colloid, may be similarly used as an inhibitor of coagulation to prevent the bonding agent getting into a continuous state or setting to a gel. In this case, it seems that the increase of viscosity due to the sodium silicate probably slows the brownian movement of the globules of adhesive and so hinders their enchainment. It is difficult to give exact rules for the use of these substances or to stipulate the quantities required. I have had good results using 2-5% of ammonium linoleate and 2-5% of sodium silicate based on the total weight of solids in the mix.

In the utilization and application of this discovery to the production of separators for electric storage batteries, an extremely large number of substances having a great variety of varying physical characteristics become available. Furthermore, in most cases, emulsions of two or more of the cementing materials may be mixed or they may first be mixed with separate portions of comminuted substances and these portions afterwards mixed together. In this way, it has been found that it is possible to make a great variety of new products which represent almost every conceivable physical variant in the way of moldability, flexibility, toughness and the like.

The properties of such materials may be still further modified by the incorporation therein of fibrous materials either organic or inorganic. As examples of such materials, cotton linters, asbestos fiber, mineral wool and spun glass may be mentioned.

As specific illustrations of the application of the above, I may mention the following, not with any intention of limiting the invention to the instances mentioned, but rather to make clear the broad nature of their application. Many other applications and modifications will readily occur to those skilled in the art.

As an excellent illustration of such emulsion and one which is available on the market, I may take rubber latex. This when thoroughly mixed with the necessary proportions of sulphur for vulcanization to hard rubber and of water to obtain a pasty mixture with such substances as diatomaceous earth, the whole being made up in such a manner that there will be approximately 25% by weight of vulcanized hard rubber in the resultant material, will when treated according to the invention give a product prior to vulcanization which can be readily molded by rolling or hydraulic pressure into smooth or ribbed sheets which can then be vulcanized in the usual way, the sheets being separated during vulcanization by layers of porous paper, cloth, screen or talc, and afterwards cut or trimmed to such sizes as may make them most suitable for separators in the ordinary forms of storage batteries, or for other uses.

In carrying out the above, owing to the tendency of ordinary hydrated diatomaceous earth to depolarize the rubber latex particles, thus causing their premature coagulation, it is advisable to use calcined diatomaceous earth, which has an almost neutral reaction. Where heat alone is used to cause the rubber globules to adhere to the diatomaceous particles in the wet state, insufficient adhesion sometimes occurs, perhaps due to absorbed water on the diatoms. This can be avoided by drying before vulcanization to the point where adhesion occurs (usually about 5% to 10% total water content) rewetting and then vulcanizing as before. Complete drying is apt to result in a loss of porosity by shrinkage.

It may be of assistance in trying the above mixture to observe the following directions and proportions: To 80 lbs. of calcined diatomaceous earth in a dough mixer, add 9 lbs. of 300-mesh sulphur and mix dry. Then add enough water to moisten to a just mixable paste (probably about 100 lbs.) and mix. With the machine running, add 50 lbs. of 40% rubber latex, pouring quite slowly so as not to allow the mixture to get soupy in local spots. On the other hand, do not mix longer than necessary to make an even paste. The results should have a consistency such that it can be buttered in a thin layer on cloth of close mesh. If too wet or too dry to butter well, adjust the water mentioned above accordingly. Allow sheet to air dry on cloth until the material has solidity between thumb and finger, then pass between rolls to reduce sheet to uniform thickness, and air dry until there is no further loss in weight. It is safer until experience is had, not to use heat in drying, as heat makes it easy to dry to the point of shrinkage. Remoisten moderately by spraying and place sheets, mix side down, on sheets of iron, and pile the sheets in a hydraulic press. Pressures as high as 2000 lbs. per square inch can be used, but only 200 lbs. may be sufficient. Release pressure and vulcanize at 50 lbs. steam pressure for about three hours. Any tendency to stick to the rolls or to the sheet iron can be overcome by lubricating their surfaces with castor oil. The cloth sheets should detach easily after vulcanization. The resulting separator sheets can then be cut to the desired sizes.

As a second illustration, I may replace the latex in the above, with the consequent omission of the sulfur, by an emulsified condensation product, such as Bakelite. Such a product has now been placed on the market with the plastic cement in the inner or discontinuous phase and is sold under the tradename of Durex by General Plastics, Inc.

The subsequent condensation may take place either directly through the use of heated molds, or in a vulcanizer or any suitable ovens. About the same portion of the condensing cement may be employed, namely, 25% by weight in the finished product.

As a third illustration, I may take equal portions of the two mixtures mentioned above as the first and second illustrations, before heating, and mix and heat them as before. The resulting material or product has especially valuable properties in that the presence of the condensation product tends to prevent the oxidation of the rubber by electrolytic action.

As a fourth illustration, an emulsion of any pitch, asphalt, resinous, waxy or bituminous substance with water may be made in a mixing machine at any temperature below the boiling point of water at which such substances may be plastic, by using a small quantity, say 5% or 10% of a porous hydrous material such as diatomaceous earth. In the case of substances which only become plastic at higher temperatures, the mixing may be done in an autoclave. In all such emulsions, the cementing agent tends to be in the continuous phase, but they may be readily reversed by the introduction of a suitable colloid. I have found the colloidal clay marketed under the name of "Bentonite" to be entirely suitable for this purpose. After the emulsion is made, more water and the inert powder are added and the molding and setting operations are conducted as outlined above. As a more specific illustration of this, a mixture, made by melting together two parts of cumarone varnish grade resin and one of steam refined asphaltic oil residue, may be emulsified with water in a mixer as above and then mixed in the proportion of 25% of the binding agent with 75% of diatomaceous earth and the whole molded and set by heat as outlined before.

As a fifth illustration, I may emulsify sodium silicate solution with a volatile oil such as toluene and proceed as before. In this case, the cementing action is enhanced by the chemical combination taking place between the sodium silicate and the hyaline silica of the diatomaceous earth. Instead of the volatile oil, a non-volatile oil such as castor oil may be used, this being afterwards removed by washing with light volatile miscible oils.

In the sixth illustration, an emulsion of pyroxylin may be made from any of its solutions and the mass solidified as before.

To any of the above may be added 2% or more of fibrous material such as cotton linter or the whole mass may be molded upon a flexible fibrous sheet such as fibrous sheets of glass wool which are available on the market.

Although mention has been made of mixtures in which the cement constitutes 25% by weight of the resultant mass, it is obvious that the proportions employed may vary according to the nature of the cementing substance and according to the properties desired in the resultant material. Exact control of the cementing of the particles of powdered material is obtainable by predetermining their average size as by sieving or by flotation methods, and controlling the size of the globules of dispersed binder so that they are much finer than said particles of powdered material, and then controlling the amount of binding globules so that when they are caused to adhere to the proximate portions of adjacent particles, they will leave the desired amount of void space. It is clear that the porosity of the final body is the ratio between the apparent volume of solids present and the volume of the resultant voids.

It should also be recognized that any acid resistant substance capable of being reduced to a fine powder may be used in place of the diatomaceous earth. Thus, mica, kaolin, and certain varieties of amphibole asbestos whose fibers are so short that the mass does not appear fibrous, are entirely suitable for use.

It should also be noted that, particularly in the case of diatomaceous earth, although the proportion of binder by weight may appear large, yet due to the extremely high percentage of voids in the former, the actual proportion of the binder by volume may run as low as 5%, thus, in part, accounting for the extraordinary permeability which materials made in accordance with these specifications have been found to have. The same relation holds to a greater or less degree in the case of finely divided solid material due to the state of subdivision, so that where maximum porosity is desirable, the binder should be present in a minor proportion by volume.

Any of the above mixtures may initially contain enough liquid to make it fluid, so it may be applied directly to the electrodes or to a fibrous support as paint. With less liquid it can be pasted as a layer on cloths or wire netting or into molds. With still less, it can be rolled into plain, ribbed or corrugated sheets. With soaps or other lubricating agents, it can be extruded into flat or round forms or tubes.

The finished product may be used to support what are generally known as active materials in electrolytic cells, rather than relying principally upon the usual heavy metallic support as in the case of metallic grids or plates.

Due to the described distribution and method of application of the binder, the resultant body or product has remarkable tensile strength and resistance to abrasion, even when as little as 10% by weight of the binder is used, and will withstand all ordinary handling. The electrical resistance is low (it can be lower than that of the usual wood diaphragm), and does not increase faster than the thickness as is usually the case when binders are used in solution. Under the microscope, there at first appears to be no binder present at all due to its fineness and distribution at desirable points, so that the tiny cementing bonds between particles are easily overlooked. This presents strong contrast with the appearance of separators made with binders as in the prior art, as in these the binder is much in evidence, forming a kind of network in which particles are embedded and imprisoned.

Figure 2:
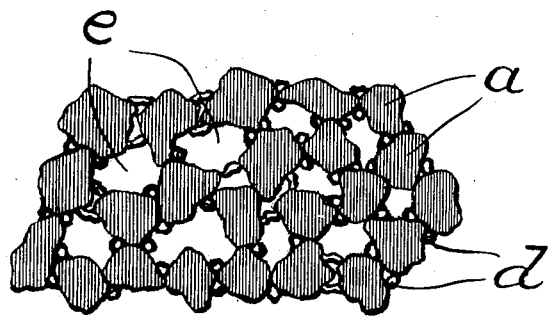

For the sake of further explanation, and not by way of limitation, I have prepared a schematic and diagrammatic drawing made to an exaggerated scale and in which, Figure 1 may be regarded as a section taken on any plane of the admixture and it shows particles of binder in the discontinuous phase of an emulsion and scattered in voids provided between the particles of filler and also other particles of binder bonding the particles of filler, and Figure 2 is a like view of the admixture after the step of partial drying or solidification of the emulsion, showing the particles of binder assembled into individual bonds and confined to the surfaces of particles of filler which they connect, thus providing the microporous product.

In the drawing, and referring to Figure 1, *a* indicates the particles of filler which usually differ in size or shape, and *b* indicates the voids which necessarily exist between them. *c* indicates particles of binder in the discontinuous phase of the emulsion of which the liquid phase is illustrated by shade lines. Some of these particles of binder bond the particles of filler and some occupy space in the voids while diffused in the liquid phase of the emulsion. Referring to Figure 2 most of the liquid phase has been removed and the mixture solidified by drying, as by heat and pressure as distinguished from solidification in the presence of water by coagulation, and by the drying and solidification the particles of binder have been assembled into individual bonds *d* by capillary or like action, leaving the micropores *e* unobstructed by them. The particles of filler are indicated as larger than the particles of binder, but no attempt is made to indicate proportions in which the filler greatly exceeds the binder.

I claim:

1. The method of making electrolytically permeable microporous separators possessed of mechanical strength which consists in mixing an emulsion of a binder in the discontinuous phase with particles of filler in such proportion that the desired microporosity is provided by the voids between the particles of filler, before setting the binder substantially drying the mixture while the binder is maintained in the discontinuous phase, thereby assembling the scattered particles of binder into individual non-porous bonds confined to the points on the surfaces of the particles of filler which they bond, and subsequently heating the mixture to set the binder.

2. The method of making electrolytically permeable microporous separators possessed of mechanical strength which consists in mixing an emulsion of a binder in the discontinuous phase with particles of filler in such proportion that the desired microporosity is provided by the voids between the particles of filler, removing at least 95% of the liquid of the continuous phase from the mixture while the binder is maintained in the discontinuous phase, thereby assembling the scattered particles of binder into individual non-porous bonds confined to the points on the surfaces of the particles of filler which they bond, and subsequently heating the mixture to set the binder.

3. The method of making electrolytically permeable microporous separators possessed of mechanical strength which consists in mixing an emulsion of binder in the discontinuous phase with particles of filler and a protective inhibitor of coagulation in such proportions that the desired microporosity is provided by the voids between the particles of filler, substantially drying the mixture, thereby assembling the scattered particles of binder into individual non-porous bonds confined to the points on the surfaces of the particles of filler which they bond, shaping the mass and subsequently setting the binder while still in the discontinuous phase by the application of heat.

4. The method of making electrolytically permeable microporous separators possessed of mechanical strength which consists in mixing an emulsion of binder of rubber-like material in the discontinuous phase with particles of filler and a protective inhibitor of coagulation in such proportions that the desired microporosity is provided by the voids between the particles of filler, substantially drying the mixture, thereby assembling the scattered particles of binder into individual non-porous bonds confined to the points on the surfaces of the particles of filler which they bond, shaping the mass and subsequently setting the binder while still in the discontinuous phase by vulcanizing in the presence of moisture.

WILLIAM E. KERSHAW.